United States Patent
Jelinek et al.

(10) Patent No.: US 8,537,272 B2
(45) Date of Patent: Sep. 17, 2013

(54) METHOD AND SYSTEM FOR DESIGNING OPTIMAL FLUTTER SHUTTER SEQUENCE

(75) Inventors: Jan Jelinek, Plymouth, MN (US); Scott McCloskey, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 391 days.

(21) Appl. No.: 12/948,015

(22) Filed: Nov. 17, 2010

(65) Prior Publication Data
US 2011/0216211 A1 Sep. 8, 2011

Related U.S. Application Data

(60) Provisional application No. 61/309,586, filed on Mar. 2, 2010.

(51) Int. Cl.
*H04N 5/228* (2006.01)
*H04N 9/64* (2006.01)
*H04N 5/238* (2006.01)

(52) U.S. Cl.
USPC ............ 348/367; 348/208.12; 348/248

(58) Field of Classification Search
USPC ............ 348/208.4, 208.6, 208.12, 241, 248, 348/362, 367; 382/115, 190, 191
See application file for complete search history.

(56) References Cited

U.S. PATENT DOCUMENTS

| 7,580,620 B2* | 8/2009 | Raskar et al. | 396/55 |
| 2006/0119710 A1 | 6/2006 | Ben-Ezra et al. | |
| 2007/0092245 A1 | 4/2007 | Bazakos et al. | |
| 2007/0098383 A1 | 5/2007 | Stavely et al. | |
| 2007/0258706 A1 | 11/2007 | Raskar et al. | |
| 2008/0062287 A1* | 3/2008 | Agrawal et al. | 348/241 |
| 2009/0277962 A1* | 11/2009 | McCloskey | 235/462.01 |
| 2010/0220896 A1* | 9/2010 | McCloskey et al. | 382/115 |

* cited by examiner

*Primary Examiner* — Daniel M Pasiewicz
(74) *Attorney, Agent, or Firm* — Kermit D. Lopez; Luis M. Ortiz; Kevin Soules

(57) ABSTRACT

A method, system and computer-usable medium for determining an optimal shutter fluttering sequence. The disclosed approach is based on the use of shutter flutter technology, which means that an image can be acquired in such a manner as to encode all information about the moving subject. The disclosed approach involves determining a shutter's fluttering pattern that optimally encodes information at all frequencies. The disclosed approach involves an optimization method for finding a shutter fluttering pattern that maximizes the minimum value of a function defining the plurality of flutter shutter sequences over a frequency domain. The disclosed approach involves eliminating all flutter shutter sequences that contain lost frequencies. The objective of the disclosed approach is to select an optimal flutter shutter sequence for implementation with a flutter shutter camera.

19 Claims, 3 Drawing Sheets

METHOD AND SYSTEM FOR DESIGNING OPTIMAL FLUTTER SHUTTER SEQUENCE

CROSS-REFERENCE TO PROVISIONAL APPLICATION

This application claims the benefit of priority based on U.S. Provisional Patent Application Ser. No. 61/309,586 filed Mar. 2, 2010 entitled "METHOD AND SYSTEM FOR DESIGNING OPTIMAL FLUTTER SHUTTER SEQUENCES". The above-referenced provisional patent application is hereby incorporated by reference herein in its entirety.

STATEMENT OF GOVERNMENT RIGHTS

The invention disclosed in this application was made with Government support under Contract Number W91CRB-09-C-0013 awarded by the U.S. Army Research Office. The Government has certain rights in the invention.

TECHNICAL FIELD

Embodiments are generally related to the field of security systems and biometric identification. Embodiments are also related to face and iris-based recognition biometric authentication methods and systems. Embodiments are additionally related to flutter shutter technology. Embodiments are additionally related to image-processing techniques, devices, and systems.

BACKGROUND OF THE INVENTION

Acquiring sharply focused images of moving people or objects is a fundamental and challenging problem in several surveillance applications, particularly iris-based biometrics and face recognition.

Iris recognition is a method of biometric authentication that utilizes pattern recognition techniques based on high-resolution images of the irises of an individual's eyes. Iris recognition relies on camera technology with subtle infrared illumination reducing specular reflection from the convex cornea to create images of the detail-rich, intricate structures of the iris. Converted into digital templates, these images provide mathematical representations of the iris that yield unambiguous positive identification of an individual.

Iris recognition has been recently recognized and gained much attention due to its high reliability in identifying humans. Its suitability as an exceptionally accurate biometric derives from its extremely data-rich physical structure, genetic independence (no two eyes are the same even for twins), stability over time, and non-contact means (a feature important for non-cooperative subjects).

Facial recognition typically involves the use of a computer application for automatically identifying or verifying a person from a digital image or a video frame from a video source. One of the ways to accomplish this is by comparing selected facial features from the image and a facial database.

One type of device that has been found in use in biometric identification and authentication is the flutter shutter camera, based on flutter shutter technology. Note that a non-limiting example of a flutter shutter camera and flutter shutter technology in general is disclosed in U.S. Patent Application Publication Serial No. US2007/0258707A1, entitled "Method and Apparatus for Deblurring Images," which published to Ramesh Raskar on Nov. 8, 2007, and is incorporated herein by reference. Another non-limiting example of a flutter shutter camera and flutter shutter technology is disclosed in U.S. Patent Application Publication Serial No. US2007/0258706A1, entitled "Method for Deblurring Images Using Optimized Temporal Coding Patterns," which published to Ramesh Raskar, et al. on Nov. 8, 2007, and is incorporated herein by reference.

Biometric identification thus has great potential to enhance controlled access and even surveillance of high security areas. Much of this potential can only be realized by acquiring images from non-cooperative subjects. Like other applications that exploit visual information, however, biometrics is limited by the ability to acquire high-quality images in certain situations. One situation that is particularly challenging is the acquisition of sharply focused iris images or facial images from moving subjects. Given a modest amount of light, as is common indoors, relatively long exposures are necessary at even the widest aperture setting. For moving subjects, this produces motion-blurred images which lack much of the crucial high-frequency information needed to perform iris matching.

For an application like iris recognition, wherein fine scale features are essential to proper classification, the use of a traditional shutter imposes some fundamental limits on the extent of motion blur that can be tolerated. At large distances, taking images of moving subjects also raises eye safety concerns. First, a tolerable level of motion blur, or degradation, is identified which will still allow the biometric system to operate properly. In order to maintain image quality, a certain amount of energy as necessary for a well-exposed picture. Therefore, shortening the exposure time must be compensated by increasing illumination power. Eventually this tradeoff is limited by a maximum illumination power that is safe for the human eye.

Motion blur, as through a traditional shutter, is equivalent to convolution of a sharply-focused image with a box filter. Motion-blurred images of this type lack information regarding the object at a number of spatial frequencies. This lack of information is irreversible and no post processing can recover it from the image. Methods that attempt to deblur the image will severely amplify sensor noise, hallucinate content, or both.

To avoid this loss of information during image capture, some prior art approaches have advocated the use of a fluttering shutter and demonstrated the ability to recover high-quality images despite blur from moving objects. During exposure, the camera's shutter flutters between open and closed while exposure is accumulated on the sensor. This produces an image with coded blur which, unlike traditional blur, conveys information about the subject at all spatial frequencies. Given a suitably designed processing method that is based on the shutter's fluttering pattern, deblurring recovers an image with low levels of noise while avoiding reconstruction artifacts.

In moderate and low lighting conditions, however, the need to use long exposure times causes images of moving subjects to be significantly degraded by blur. This blur will destroy fine details to an extent that the image will be useless for identification. It is therefore necessary to design systems that are capable of acquiring sharp images of subjects despite large distances and subject motion.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a method and system for enhanced biometric identification.

It is another aspect of the present invention to provide for an enhanced shuttering method and system.

It is yet a further aspect of the present invention to provide for a method and system for determining an optimal shutter fluttering sequence.

The aforementioned aspects and other objectives and advantages can now be achieved as described herein. A method and system for determining an optimal shutter fluttering sequence is disclosed. The disclosed approach is based on the use of shutter flutter camera technology, which means that an image can be acquired in such a manner as to encode all information about the moving subject. The disclosed approach involves determining a shutter's fluttering pattern that optimally encodes information at all frequencies. Previous approaches to determining such a shutter were incapable of incorporating constraints arising from the particular camera hardware and make the further unreasonable assumption that the shortest available open shutter time is sufficiently short to stop motion. The disclosed approach avoids these problems and identifies shutter patterns that can directly be utilized by a camera and software.

The disclosed approach involves an optimization method for finding a shutter fluttering pattern by eliminating shutter fluttering sequences which fail to meet certain criteria. The elimination process begins by defining a total required exposure time necessary for a camera to develop a well exposed image of a target moving at a given speed. The total necessary exposure time can then be divided up into irregular intervals of time called on and off chops. The sum total of the required time is the total time of on chops. A function describing the sequence of on and off chops can then be expressed in the frequency domain using a Fourier transform.

The space of potential fluttering patterns is prohibitively large to search exhaustively. One of the keys to the disclosed approach is that the search for the optimal (or a near-optimal) fluttering pattern can be made tractable by applying the jurys algorithm to the expression of the flutter shutter sequences in terms of frequency. Frequencies which have roots on the unit circle in polar coordinates correspond to lost frequencies. Thus, the method entails eliminating any flutter shutter sequence that has roots on or near the unit circle, which correspond to lost frequencies. In essence, the jury algorithm is used to identify flutter shutter sequences that maximizes a minimum value of a function defining a flutter shutter sequence over a particular frequency domain.

Once the Jury's algorithm has narrowed the field of possible flutter shutter sequences, the remaining sequences can be checked for smoothness. The smoothest remaining sequence is then selected as the optimal flutter shutter sequence.

At a high level, the disclosed embodiments take as input parameters the required exposure time (this will be the sum of the durations of the open shutter periods) based on the subjects velocity (measured in pixels per millisecond). The disclosed embodiments incorporate hardware constraints by respecting the minimum allowable open shutter duration. Its output is the optimal fluttering pattern which can then be employed using a flutter shutter camera to acquire a well exposed image of the target.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
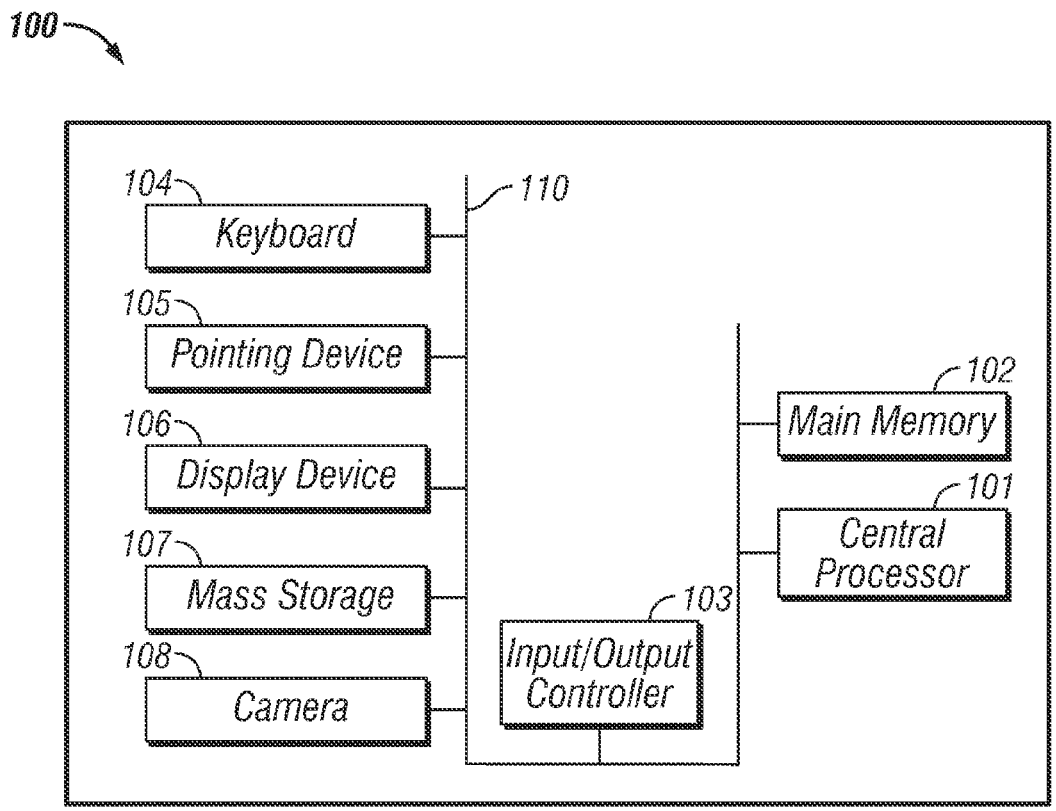
FIG. 1 illustrates a schematic view of a data-processing system in which the present invention may be embodied, including the use of a biometric reader, which may incorporate the use of, for example, a camera.
Figure 2:
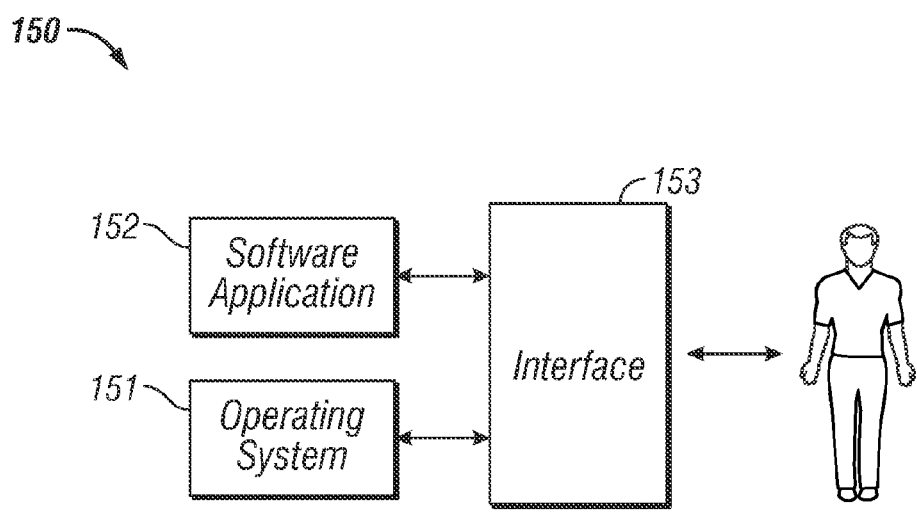
FIG. 2 illustrates a schematic view of a software system including an operating system, application software, and a user interface for carrying out the present invention.
Figure 3:
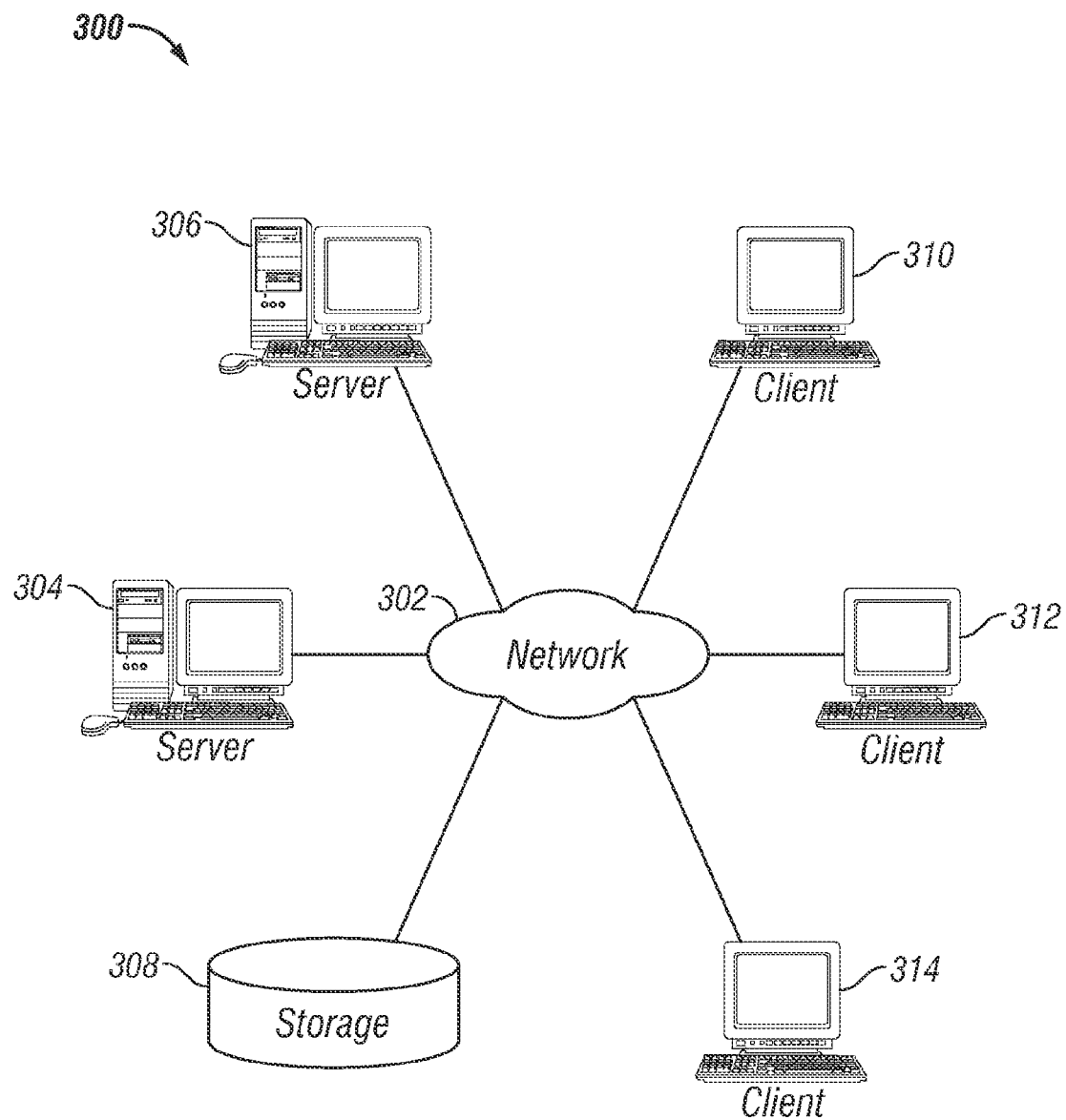
FIG. 3 illustrates a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage component 107 (e.g., hard disk). A camera 108 may be employed to communicate with the data-processing system 100. Camera 108 can be implemented as, for example, a flutter shutter camera, which may be employed in the context of a biometric authentication system such as, for example, an iris and/or facial biometric recognition system or device. A flutter shutter camera can be configured as a camera capable of capturing moving objects at an exposure time of, for example, over 50 milliseconds, like high speed motion cameras. Using a coded exposure sequence, the flutter shutter camera can recover, for example, text from a speeding car and sharpen images. As illustrated, the various components of the data-processing system 100 communicate through a system bus 110 or similar architecture.

FIG. 2 illustrates a computer software system 150 for directing the operation of the data-processing system 100 depicted in FIG. 1. Software system 150, which is stored in system memory 102 and on disk memory 107, can include a kernel or operating system 151 and a she or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/ or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operating systems such as, for example, Linux may also be employed with respect to the operating system 151 and interface 153. Application module 152, on the other hand, can include instructions such as the various operations described herein with respect to the various components and modules described herein such as, for example, the method 400 depicted in FIG. 4.

FIG. 3 illustrates a graphical representation of a network of data processing systems in which aspects of the present invention may be implemented. Network data processing system 300 can be provided as a network of computers in which embodiments of the present invention may be implemented. Network data processing system 300 contains network 302, which can be utilized as a medium for providing communication links between various devices and computers connected together within network data processing system 300. Network 302 may include connections such as wired, wireless communication links, fiber optic cables, USB cables, Ethernet connections, and so forth.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In some embodiments, network data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 may also be implemented as a number of different types of networks such as, for example, a secure intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100, computer software system 150, data-processing system 300, and network 302 depicted respectively FIGS. 1-3. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 4:
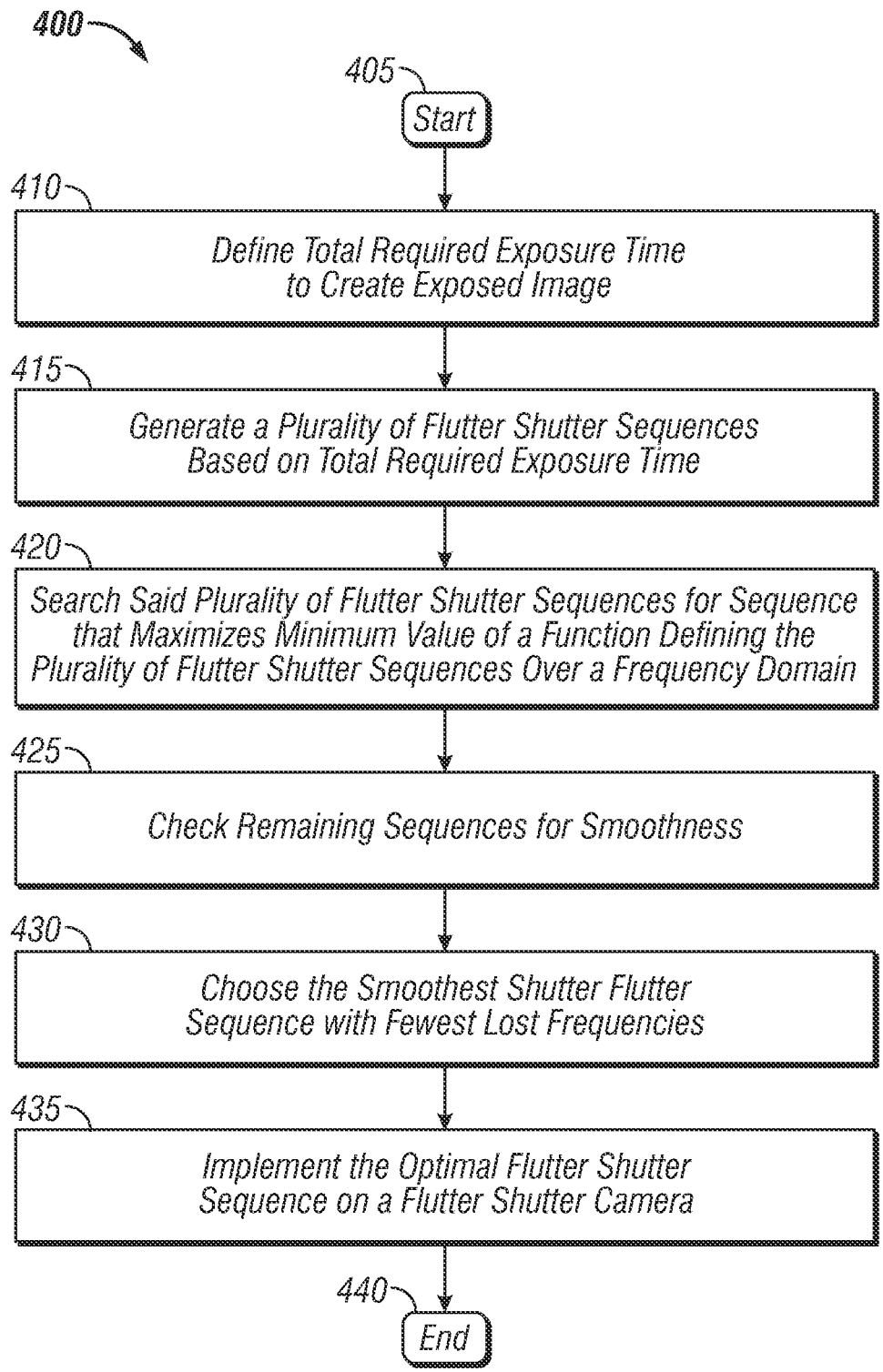
FIG. 4 illustrates a high-level flow chart of operations depicting logical operational steps of a method of determining a shutter fluttering sequence.

FIG. 4 illustrates a high-level flow chart of operations depicting logical operational steps of a method 400 of determining an optimal flutter shutter sequence, in accordance with a preferred embodiment. Note that the method 400 of FIG. 4 and other methodologies disclosed herein can be implemented in the context of a computer-useable medium that contains a program product. Programs defining functions on the present invention can be delivered to a data storage system, which can include, without limitation, non-writable storage media (e.g., CD-ROM), writable storage media (e.g., hard disk drive, read/write CD ROM, optical media), and, for example, system memory such as, but not limited to, Random Access Memory (RAM).

Embodiments may be implemented by, for example, a system having means in the form of hardware, software, or a combination of software and hardware as described herein or their equivalent. Thus, the method 400, for example, described herein can be deployed as process software in the context of a computer system or data-processing system such as that depicted in FIGS. 1-3.

Note that the disclosed embodiments describe and illustrate an optimization method for finding an optimal flutter shutter sequence. As indicated at block 405, the process begins. When a target is in motion, any finite exposure time will result in blur. Therefore, a threshold degradation level must be established to allow for a finite shutter time that will still render a quality image. Decreased exposure time may be compensated by increased illumination power. However, such a tradeoff is limited by the total safe illumination power for a human eye. The first step 410 in the method described in FIG. 4, is to define the total required exposure time. This time will be determined based on the target velocity and illumination power as described above.

A flutter shutter consists of alternating on and off intervals of a camera shutter, whose lengths are integer multiples of a short interval called the "chop". A flutter shutter sequence is a set of irregularly timed "on chop" intervals. A target's velocity acts as a low pass filter, which strips the image of its high spatial frequency components. By looking at the filter's Modulation Transfer function (MTF), it becomes clear that for a given exposure time and irradiance level the function drops to zero and the information concerning scene details that correspond to those zero frequencies are lost. These frequencies are known as lost frequencies. The flutter shutter effect can be used to effectively fill the gaps left by the lost frequencies. Removing the zeros makes the filter invertible, which in turn allows a correction to be made to the motion blur without the use of regularization methods.

The second step 415 is to generate a plurality of flutter shutter sequences according to the total required exposure time based on target velocity and safe illumination power. Most of the possible sequences (that is, sequences that provide enough exposure time with a given irradiance level) are useless because they fail to remove the zeros at the lost frequencies. Other sequences may not have any lost frequencies. However, these frequencies fill the gaps so little that they are effectively useless because they cannot improve the image quality beyond the image noise levels.

Therefore, as indicated at step 420, the sequences must be searched to determine which will provide the best fill for the lost frequencies. An exhaustive search of sequences is, in practice, impossible because the number of candidate sequences grows exponentially. However, a mathematical approach using the Jury's test (and/or alternatively the related Schur-Cohn algorithm) can be used to efficiently search for sequences that do not have the lost frequencies.

By taking the Fourier transform of the shutter sequence, the sequence can be studied as a polynomial equation in the spatial frequency spectrum. Where this spectrum goes to zero defines the lost frequencies. Of the N roots (or values of the function that are zero) those having a modulus of 1 (those that lie on the unit circle) in polar coordinates correspond to lost frequencies. Thus, the search for optimal sequences consists of searching for sequences which do not have roots on (or near) the unit circle.

The criteria could be alternatively defined as searching for an optimal chop sequence within all the chop sequences of a given length, that maximizes the minimum value of the function defining the sequence of a given frequency range. Searching the continuous function defining the sequences for minima could solve this problem. However, the function includes many minima so searching for the global minimum is not trivial. In addition, such a search must be repeated for every candidate chop sequence. Thus, solving this problem by searching for a global minimum for every chop sequence is very computationally expensive, and for practical purposes, not acceptable.

Instead, a root location heuristically known as the Jury's test can be used. The Jury's test is a very computationally efficient algorithm that is used to establish if all the roots of an equation are inside the unit circle. This information can in turn be used to determine the number of roots on the unit circle.

As discussed above, even though some candidate sequences may not have a root on the unit circle, if the drop is very low at a given frequency the drop may be too much to overcome the signal to noise ratio. Therefore, the sequence is still useless for practical purposes. Thus, the search for roots using the jury algorithm must include a tolerance ring that effectively increases the width of the unit circle. This is accomplished by rescaling the coordinate system to change the unit circle radius. Any rescaling factor could be used. For example, the rescaling factor could increase the unit circle radius to 0.95 and 1.05. When the Jury's test is preformed the results will indicate roots located within the range 0.95 to 1.05, thereby identifying sequences which have roots too dose to zero to be practically useful.

Next, as indicated at block 425, the remaining sequences are checked for smoothness. After the Jury's test is preformed the majority of the candidate sequences are eliminated. However, it is still necessary to select the optimal sequence from those remaining. As an example, suppose the desired chop sequence has 10 on chops with a duty cycle of 50%. This means there are 12780 sequences to search. We further choose a tolerance ring around the unit circle of ±0.05. After performing the method described above, only 9 of 12870 candidates have no roots within the ring. While any of the 9 candidates will suffice, the sequences can be checked for smoothness. The smoothest remaining sequence is then selected as the optimal flutter shutter sequence as indicated by block 430. This accounts for the variance of the sequences to ensure that no particular spatial frequencies are preferred or left out because of theft signal to noise ratio.

The optimal flutter shutter sequence is then implemented on a flutter shutter camera as described at block 435. The fluttering shutter effect along with the optimal flutter shutter sequence allows for the camera to capture a well exposed image of a moving target. The ability to capture images of moving targets may be useful in a number of related arts. For example, the image may be useful in biometric identification applications. The method then ends as indicated at block 440.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" or "data-processing system" includes any data-processing apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for determining an optimal flutter shutter sequence, said method comprising:
    defining a total required exposure time for a flutter shutter camera, wherein said total required exposure time is determined by an amount of energy required to create an exposed image;
    generating a plurality of flutter shutter sequences, wherein said plurality of flutter shutter sequences includes a plurality of on chops which sum to said total required exposure time, said plurality of flutter shutter sequences associated with said flutter shutter camera; and
    searching said plurality of flutter shutter sequences for optimal flutter shutter sequences, wherein said optimal flutter shutter sequences maximize a minimum value of a function defining said plurality of flutter shutter sequences over a particular frequency domain in order to thereafter implement said optimal flutter shutter sequences via said flutter shutter camera; and
    wherein searching said plurality of flutter shutter sequences further comprises: eliminating flutter shutter sequences among said plurality of flutter shutter sequences, which include a root on a unit circle in said particular frequency domain, which correspond to lost frequencies, utilizing a Jury algorithm.

2. The method of claim 1 further comprising implementing said optimal flutter shutter sequences via said flutter shutter camera.

3. The method of claim 1 wherein searching said plurality of flutter shutter sequences further comprises: eliminating flutter shutter sequences among said plurality of flutter shutter sequences which include a root on a unit circle in said particular frequency domain, and which correspond to lost frequencies, utilizing a Schur-Cohn algorithm.

4. The method of claim 1 further comprising: rescaling a radius of said unit circle to eliminate flutter shutter sequences among said plurality of flutter shutter sequences, which have values corresponding to frequencies near zero.

5. The method of claim 1 further comprising: evaluating remaining flutter shutter sequences among said plurality of flutter shutter sequences for smoothness; and selecting a smoothest remaining flutter shutter sequence among said plurality of flutter shutter sequences as said optimal flutter shutter sequence.

6. The method of claim 1 further comprising: capturing an image of a target subject from among a plurality of subjects via said flutter shutter camera, wherein a shutter of said flutter shutter camera is opened according to said optimal flutter shutter sequence.

7. The method of claim 6 further comprising: utilizing said optimal flutter shutter sequence with respect to said flutter shutter camera and said target subject to biometrically identify said target subject among said plurality of subjects.

8. A system for determining a shutter fluttering sequence, said system comprising:
a processor;
a data bus coupled to the processor; and
a computer-usable medium embodying computer code, the computer-usable medium being coupled to the data bus, the computer program code comprising instructions executable by the processor and configured for:
defining a total required exposure time for a flutter shutter camera, wherein said total required exposure time is determined by an amount of energy required to create an exposed image;
generating a plurality of flutter shutter sequences, wherein said plurality of flutter shutter sequences includes a plurality of on chops which sum to said total required exposure time, said plurality of flutter shutter sequences associated with said flutter shutter camera; and
searching said plurality of flutter shutter sequences for optimal flutter shutter sequences, wherein said optimal flutter shutter sequences maximize a minimum value of a function defining said plurality of flutter shutter sequences over a particular frequency domain in order to thereafter implement said optimal flutter shutter sequences via said flutter shutter camera, wherein searching said plurality of flutter shutter sequences further comprises: eliminating flutter shutter sequences among said plurality of flutter shutter sequences, which include a root on a unit circle in said particular frequency domain, which correspond to lost frequencies, utilizing a Jury algorithm.

9. The system of claim 8 wherein said instructions are further configured implementing said optimal flutter shutter sequences via said flutter shutter camera.

10. The system of claim 8 wherein searching said plurality of flutter shutter sequences further comprises: eliminating flutter shutter sequences among said plurality of flutter shutter sequences which include a root on a unit circle in said particular frequency domain, and which correspond to lost frequencies, utilizing a Schur-Cohn algorithm.

11. The system of claim 8 wherein said instructions are further configured for resealing a radius of said unit circle to eliminate flutter shutter sequences among said plurality of flutter shutter sequences, which have values corresponding to frequencies near zero.

12. The system of claim 8 wherein said instructions are further configured for evaluating remaining flutter shutter sequences among said plurality of flutter shutter sequences for smoothness; and selecting a smoothest remaining flutter shutter sequence among said plurality of flutter shutter sequences as said optimal flutter shutter sequence.

13. The system of claim 8 wherein said instructions are further configured for capturing an image of a target subject from among a plurality of subjects via said flutter shutter camera, wherein a shutter of said flutter shutter camera is opened according to said optimal flutter shutter sequence.

14. The system of claim 13 wherein said instructions are further configured for utilizing said optimal flutter shutter sequence with respect to said flutter shutter camera and said target subject to biometrically identify said target subject among said plurality of subjects.

15. The system of claim 9 wherein said instructions are further configured for utilizing said shutter fluttering sequence with respect to said flutter shutter camera and said target subject to biometrically identify said target subject among said plurality of subjects.

16. A non-transitory computer-usable medium for determining a shutter fluttering sequence, said computer-usable medium embodying computer program code, said computer program code comprising computer executable instructions configured for:
defining a total rewired erasure time for a flutter shutter camera, wherein said total required exposure time is determined by an amount of energy required to create an exposed image;
generating a plurality of flutter shutter sequences, wherein said plurality of flutter shutter sequences includes a plurality of on chops which sum to said total required exposure time, said plurality of flutter shutter sequences associated with said flutter shutter camera; and
searching said plurality of flutter shutter sequences for optimal flutter shutter sequences, wherein said optimal flutter shutter sequences maximize a minimum value of a function defining said plurality of flutter shutter sequences over a particular frequency domain in order to thereafter implement said optimal flutter shutter sequences via said flutter shutter camera, wherein searching said plurality of flutter shutter sequences further comprises: eliminating flutter shutter sequences among said plurality of flutter shutter sequences, which include a root on a unit circle in said particular frequency domain, which correspond to lost frequencies, utilizing a Jury algorithm.

17. The non-transitory computer-usable medium of claim 16 wherein said optimal flutter shutter sequences are capable of being implemented by said flutter shutter camera.

18. The non-transitory computer-usable medium of claim 16 wherein said computer executable instructions are further configured for resealing a radius of said unit circle to eliminate flutter shutter sequences among said plurality of flutter shutter sequences, which values corresponding to frequencies near zero.

19. The non-transitory computer-usable medium of claim 16 wherein said computer executable instructions are further configured for evaluating remaining flutter shutter sequences among said plurality of flutter shutter sequences for smoothness; and selecting a smoothest remaining flutter shutter sequence among said plurality of flutter shutter sequences as said optimal flutter shutter sequence.

* * * * *